United States Patent Office 2,994,599
Patented Aug. 1, 1961

2,994,599
REGULATING PLANT GROWTH
Dougal Harold McRae, Levittown, Pa., assignor to Rohm & Haas Company, Philadelphia, Pa., a corporation of Delaware
No Drawing. Filed May 11, 1956, Ser. No. 584,174
8 Claims. (Cl. 71—2.7)

This invention deals with a process for altering the normal cycle of plant growth or regulating growth of plants in various ways, as will be more fully developed hereinafter. According to this invention, 2,3-dichloroisobutyric acid or a soluble salt thereof is applied to a plant or to its environment before germination or at a selected stage of development or growth and at a concentration and at a rate to provide the desired response. The type and extent of response rests on such factors as species of plant, stage of development, amount of agent applied, its concentration, and conditions under which the plant develops. In a particular aspect of this invention, one of the above compounds is applied to plants or their environment at appropriate rates and concentration at any time prior to the maturity of flowers, thereby inducing abnormal flower development. The nature of the abnormal flower development may be two-fold. First, plants whose flowers are normally self-pollinating undergo abnormal flower development and subsequent flower abscission. This physiological response is comparable to what takes place in nature when a flower is not pollinated. Second, plants which are normally cross-pollinated and monoecious plants undergo abnormal flower development, but flowers do not necessarily abscise. Whether or not abscission takes place depends upon rate and concentration of applied material, other factors previously mentioned, and whether or not a source of viable pollen is available from untreated plants of the treated plant species. It is evident from the foregoing that compounds of this invention may specifically induce physiological abnormalities in the male gametophyte or that portion of the flower, the staminate flower, from which the male gametophyte is derived. It is important to emphasize that the above described physiological abnormalities induced by compounds of this invention depend upon amount of agent applied to the plant or its environment, species of plant, stage of development, and conditions under which the plant develops because herein lies an important feature of this invention.

It has previously been suggested to use other chlorinated acids to destroy plants or to cause loss of foliage or to inhibit growth. In some cases, it has been observed that peculiar changes in growth take place and some attempts have been made to utilize previously tried substances to control growth. A serious difficulty has been, however, that the margin between the level at which a desired response is obtained and the level at which phytotoxicity occurs is too narrow and the conditions for practical, useful control of growth without phytotoxicity are too critical for practical application. Furthermore, when the induced physiological abnormal flower development and subsequent flower abscission response is considered, the margin between desired effect and some other effect is also critical.

I have found that many chlorinated aliphatic acids and salts not only induce physiological abnormalities in the male gametophyte but also they induce abnormalities in the female gametophyte, thereby making some of the practical applications of this invention difficult if not impossible to apply. An important feature of the present invention is, however, that I have found that the physiological abnormalities induced in flowers by chlorinated aliphatic acids and salts is a differential phenomenon. It has been found that the male gametophyte is more sensitive to the applied agents of this invention than the female gametophytes. In other words, the male gametophyte may be made sterile with or without making sterile the female gametophyte. Important practical uses may be found for chemicals which will make the male gametophyte sterile without sterilizing the female gametophyte. For practical uses, such as chemical detasseling of corn, the differences in the differential physiological flower activity and phytotoxic activity of the chlorinated acids and salts are extremely critical. On the other hand, for practical applications wherein it is desirable to induct abnormal flower development and subsequent abscission of flowers which are normally self-pollinating, it is immaterial whether both male and female or just the male gametophyte are made sterile. For practical uses, such as delaying the normal maturity date and increasing yields of beans, the phytotoxicity, and degree of translocation of the compounds are the most important factors. Those chlorinated aliphatic acids and salts which are absorbed and translocated within the plant most readily are most phytotoxic to the plant tissues. However, induction of abnormal flower development by making sterile the male and/or the female gametophytes requires that the chemical be absorbed and translocated. Consequently, to achieve the practical uses of this invention, the active chemicals must be translocated to a degree within the treated plants but not to an extent such that phytotoxicity occurs.

I have discovered that 2,3-dichloroisobutyric acid and its soluble salts are unusual in that they may be applied over a wide range of concentrations and rates to provide a great variety of plant responses. While they can be applied at a rate to destroy plants, they can also be applied at lesser rates to induce the unusual flower effects mentioned previously without an untoward degree of phytotoxicity. Concentration and rate will vary with the plant species, with its stage of development, and with conditions at or following the time of application. Since many of the factors which bear on plant growth cannot be controlled, it is essential that the agent applied have a wide margin of safety such as I have found exists in the use of these particular materials.

It has been emphasized that in order for the compounds considered herein to elicit a desired response to plant flowers, the amount of agent applied is a critical factor. It has, moreover, been pointed out above that 2,3-dichloroisobutyric acid and its salts do not induce phytotoxicity within the desirable range of application rates in contrast to phytotoxicities obtained with other chlorinated aliphatic acids and consequently there is a wide margin of safety in the use of 2,3-dichloroisobutyric acid and its salts. In order to adequately demonstrate the differences between chlorinated aliphatic acids and salts, however, careful control of the amount of compound applied to plants is essential. I have achieved a high degree of control of applied compounds through use of a precision sprayer. The sprayer is calibrated to deliver a known quantity of chemical in terms of pounds per acre in a known volume of carrier in terms of gallons per acre. Expressing application rates in terms of pounds per acre and gallons per acre is more meaningful than using the term concentration. Furthermore, this has now become the accepted practice in the field of plant growth regulation. Examples cited in this invention, therefore, expresses application rates in terms of pounds per acre but concentrations of chemical used are also included since this term has been used in the prior art. Unless otherwise stated, compounds are applied in a carrier volume of 50 gallons per acre. However, since the compounds considered herein are translocated, the volume of carrier can be varied over a wide range, i.e.

the concentration of the solutions can be varied without altering the final outcome significantly.

The soluble salts of 2,3-dichloroisobutyric acid and also the free acid are applied to growing plants or their environment at rates between about one-tenth pound and about ten pounds per acre (concentration range about 0.02-2.5% for aqueous sprays), the application rate of the substance applied depending upon the form in which the substance is applied, the kind of plant, the stage of development of the plant, and other factors. These salts and the acid have a profound effect upon the development of the plant. One of the most important effects is upon the flowering of the treated plants as previously indicated. For example, bush bean plants, of the variety Bountiful, grown in the greenhouse were treated with sodium 2,3-dichloroisobutyrate at an application rate of 0.25 pound per acre in a carrier volume of 50 gallons per acre. The plants were treated 12 days after planting bean seed. At this age, the first set of trifoliate leaves was just beginning to expand, but no flower buds were evident. Subsequent growth of the treated plants was normal but for the fact that twenty days following treatment flowers had all abscised and no bean fruits were present on treated plants whereas fruits were developing on untreated control plants. However, following the abscission of the first bean flowers, new flowers developed and produced bean fruits to an extent such that 35 days after treatment the treated plants had yielded 80% more fruit than the untreated controls. The identical result was obtained with 2,3-dichloroisobutyric acid. The greater yield obtained with sodium 2,3-dichloroisobutyrate and its acid appeared to be due to the fact that the treatment prolonged the life of plants beyond that of untreated control plants. Whereas the treated plants were still green and actively growing at the time final yield data where obtained, the growth of the untreated control plants had ceased, the leaves were turning brown, and the bean fruits had begun to dry. Microscopic examination of flowers which abscised revealed abnormal development of the male gametophyte and abscission occurred because fertilization could not take place. Abnormal development of the female gametophyte may also have occurred, but this is not possible to ascertain by simple microscopic examination unless rather severe injury has occurred. Results similar in some respects to those described above are obtained with other chlorinated aliphatic acids and their salts, but they are not obtained without inducing marked phytotoxicity as in illustrated in Table I. Phytotoxicities obtained with compounds other than sodium 2,3-dichloroisobutyrate, other soluble 2,3-dichloroisobutyrates, and 2,3-dichloroisobutyric acid are severe, whereas phytotoxicity obtained with the 2,3-dichloroisobutyrates is not significant.

TABLE I

*Comparison of phytotoxicities*

| Treating Agent | Amount of Agent, lbs./acre | Percent Phytotoxicity |
| --- | --- | --- |
| Sodium trichloroacetate | 0.25 | 55 |
| Sodium 2,2-dichloropropionate | 0.25 | 70 |
| Sodium 2,2,3-trichloropropionate | 0.25 | 60 |
| Sodium trichloroacrylate | 0.25 | 50 |
| Sodium 2,3-dichloroisobutyrate | 0.25 | 5 |
| 2,3-Dichloroisobutyric acid | 0.25 | 5 |

At application rates lower than 0.25 pound per acre, 100 percent abscission of bean flowers may not be obtained but nevertheless yields are increased. Increased yields under these conditions are due to the dual effect of 2,3-dichloroisobutyric acid and its salts. It is well known that many biologically active chemicals exert a dual action; one concentraiton elicits a given physiological effect whereas another concentration elicits the opposite effect. For example, a plant growth hormone such as indoleacetic acid stimulates plant cell elongation at low concentrations, but at high concentrations cell elongation is inhibited. Similarly, it has been observed that at application rates of the 2,3-dichloroisobutyrates which do not induce complete abscission of the first flowers produced on beans, the flowers and subsequent bean fruits are more firmly attached to their pedicels than are those of untreated control plants. At application rates higher than 0.25 pound per acre, such as about 1 to 3 pounds per acre, at least in the case of bush beans, the induced abscission of first set flowers and flowers which are subsequently set may be such that final bean yields of greenhouse grown plants may not be so great as the yields of untreated control plants. At application rates above 5 pounds per acre, again with respect to bush beans, phytotoxicity becomes a significant factor and it is no longer possible to separate the specific physiological action of the compounds on flowers from a non-specific phytocidal action. Application rates on plant species and varieties other than bush beans to produce a given kind of growth response may be somewhat different than was found in the case of bush beans of the Bountiful variety.

Field tests were conducted with snap beans of the variety Black Valentine. Replicate plots were sprayed with solutions of a series of sodium salts of chlorinated aliphatic monocarboxylic acids and comparisons made both with each other and with control plots which were left unsprayed. The plots were sprayed two weeks after beans were planted at an application rate of 1 pound per acre (concentration 0.24%). Observations were made 49 days, 55 days and 64 days after treatment on 12 individual plants from each treatment. No beans were present on plants 49 days after they were sprayed with solutions of the sodium salts of trichloroacetic acid, 2,2-dichloropropionic acid, 2,2,3-trichloropropionic acid, trichloroacrylic acid, or 2,2,3-trichlorobutyric acid. Beans were almost entirely absent on plants treated with the salt of 2,3-dichloroisobutyric acid at a time when the first beans appeared on untreated control plants, i.e. the first flowers of treated plants had abscised. Subsequently, however, by the 49th day following treatment, bean fruits had set and the number of these steadily increased until at 64 days there were more beans on plants so sprayed than were present on the control plants, which were dying off while the thus treated plants were verdant and making verdant growth. Meanwhile, the plants sprayed with other salts remained either free of beans or at a late stage started to develop a few pods. Freezing temperatures occurred following the 64th day and the field experiment had to be discontinued. It is reasonably certain, however, that the phytotoxic action induced by salts of the compounds other than 2,3-dichloroisobutyric acid was such that final yields would not have approached or exceeded those of the untreated control plants. The increase in yield of beans at this time was from 30% to 140% for the plots sprayed with sodium 2,3-dichloroisobutyrate over other plots.

The preceding illustrations of the specific physiological activity of sodium 2,3-dichloroisobutyrate is not limiting and similar results may be obtained with the free acid and other soluble salts. Furthermore, the time of application of said compounds per se is not critical because results comparable to those described above may be obtained by treating the plants at any time before flower development. In fact, results similar to the above may be obtained by treating soil before or after planting seed and before the germinating seedling appears above the soil. The desired effects can be obtained only by satisfactory control of application rates which vary according to plant species and variety, stage of development, and conditions at the time and following application of the agents. The above cited examples together with other experiments demonstrated that the application rates and time of application of 2,3-dichloroisobutyric acids and salts which do not lead to undesirable phytotoxic effects are not so critical as they are with other chlorinated aliphatic acids and salts.

This discovery is of considerable importance and finds many valuable applications. In addition to beans, other leguminous plants such as peas, Lima beans, and soybeans may be treated with agents of this invention to induce abscission of early flowers, advance the maturity date of fruits, and increase marketable yields of fruits by prolonging the life of the treated plants. Furthermore, this discovery may apply to any plant species or variety which normally develops flowers over an extended period of time because the physiologically active life of the plant may be prolonged beyond the normal life span of untreated plants. Hand-removal of early flowers of many crop plants results in increased crop yields. Hence, my discovery provides a chemical way of doing this with economies in labor. In situations where the early flowers are not normally hand-removed, because of unprofitable labor costs, my discovery now makes possible early flower removal concomitant with profitable cost.

The agents used in this invention are the soluble salts of the 2,3-dichloroisobutyric acid, chiefly the sodium and potassium salts, or the acid. There may likewise be used ammonium salts formed with amines, ammonia, or quaternary ammonium groups, including monomethylamine, dimethylamine, trimethylamine, the ethylamines, ethanolamine, dimethylethanolamine, morpholine, pyrrolidine, or pyridine, or such quaternary groups as tetramethylammonium, benzyltrimethylammonium, dibenzyldimethylammonium, methylpyridinium, or methylmorpholinium, didodecenyldimethylammonium, N-dodecyl-N-benzyl-N,-N-dimethylammonium, N-dodecylbenzyl-N,N,N-trimethylammonium, or octylphenoxyethylbenzyldimethylammonium.

The salts can readily be applied from aqueous solution by spray or fog. The acid can be applied from an aqueous dispersion or at very low concentrations from water solutions. The solution or emulsion may contain wetting and/or sticking agents. Thus, there may be used a wetting agent such as dodecylbenzene sodium sulfonate, sodium dodecyl sulfate, an octylphenoxypolyethoxyethanol, dodecyltrimethylammonium chloride, or other anionic, non-ionic, or cationic wetting agent. The condensates of polyglycerol and oleic acid provide an interesting subclass of these agents and, when they are made with a small proportion of phthalic anhydride, they supply some sticking action as well as emulsifying and wetting action.

For the application of salt or acid, the concentration may be widely varied if it is kept in mind that the more important factor is the rate of application. Actually, these two factors must be taken together. Concentrations can conveniently be from about 0.01% to about 5% or more, provided that the rate and the method of application are suitable for the concentration used. If desired, the salts or the acid may be taken up in a water-miscible solvent, such as acetone, and the resulting concentrate diluted with water to the desired level for application or the salts may be dissolved directly in water and the resulting solutions adjusted to the desired levels. The acid, if desired, may be dispersed in water and used as an emulsion, even though most concentrated emulsions tend to break on standing.

Instead of solutions or emulsions, the 2,3-dichloroisobutyrate may be applied from dusts. Here, finely divided, inert solids are used as extenders and carriers, such substances as finely particled clays, talc, pyrophyllite, diatomaceous earth, magnesium carbonate, and mixtures of solid carriers being useful. Dispersing and/or wetting agents may often be desirably included in such formulations to ensure against agglomeration and uneven distribution.

In setting out strawberry plants in the spring, i.e. establishing new beds, it is desirable to prevent plants from setting strawberry fruits during the first year's growth. By hand-removal of flowers during the first year, it is possible to promote vegetative growth in order to establish more vigorous plants to produce better strawberries during the second and subsequent years. I have found that 2,3-dichloroisobutyric acid and salts applied at rates of 1 to 5 pounds per acre (concentration 0.24 to 1.2%) applied soon after strawberry plants are planted and before much new growth has occurred will prevent normal flower development and subsequent fruit set without evident phytotoxicity to the plants. In a newly set-out bed, counts of blossoms were made for replicates of 3 plant units and averaged. The untreated plants averaged 21 blossoms per 3 plants after 42 days. Plants sprayed at 1 pound per acre developed 13 blossoms per 3 plants, but the blossoms showed abnormalities as did also those sprayed at 5 pounds per acre, the latter developing only 4 blossoms per 3 plants. The flowers of treated plants appeared abnormal and remained unfertilized. In this way, the plants may be kept practically free of fruit during their first year in the field while vigorous vegetative growth is achieved. There may be used, to obtain results similar to the above, a number of periodic applications at relatively low rates or less frequent applications at higher rates.

In established strawberry beds, it is often advantageous to remove the first flowers which set on the plants because these flowers produce fruits which are poor in quality and also their development lowers the quality of subsequent marketable fruit. It is evident considerable hand labor may be eliminated with resultant reduction in cost. In tests with an established plant bed, strawberry plants were sprayed with sodium 2,3-dichloroisobutyrate at application rates of 0.25 and 0.5 pound per acre several days after the plants broke dormancy. At these rates, treated plants failed to produce fruits as early as untreated plants but flowers did in time set on treated plants and fruits of normal size and quality developed. In this way, chemical control of early flowers eliminated the necessity for hand-removal without injury to the plants or without reduction in yield or quality of the fruits.

In the practice of controlling undesirable plant growth by chemicals, it is customary to attempt to completely eliminate undesirable plant species and in effect sterilize the soil for extended periods of time. Situations exist, however, in which it is more practical to obtain a degree of control of plant growth rather than complete destruction of the undesirable plant species. For example, uncontrolled plant growth along highways is unsightly and it may create fire hazards. Plant growth control of such areas is desirable but complete kill of plants can lead to danger of soil erosion which maybe as objectionable or more so than the presence of uncontrolled plant growth. Furthermore, the esthetic aspect is also of considerable importance and the presence of dead or partially killed vegetation along highways and other rights of way is undesirable. A most satisfactory method to obtain control of undesirable roadside plant growth is a method whereby the plants are not completely killed but rather are controlled to a degree through a procedure which reduces to a minimum dissemination of seed of undesirable plant species. Experiments were made to determine if undesirable plant species could be controlled through preventing seed formation. The experiments include crop species as well as several weed species and plants tested included barley, oats, wheat, cocklebur, Johnson grass, redroot pigweed, ragweed, and wild oat. The plants were sprayed with solutions of sodium 2,3-dichloroisobutyrate at rates of 1, 2.5, 5, 7.5, and 10 pounds per acre. At rates from 5 pounds per acre upward, there was seed reduction of 80% to 100% accompanied by evidence of phytotoxicity at rates above 5 pounds per acre whereas at the lower application rates seed production was reduced to a degree with little evidence of phytotoxicity.

It is evident that the discoveries and examples cited thus far involve a physiological response related to abnormal flower development and subsequent abscission of flowers, a response which may be achieved through injury to the male gametophyte or both the male and female gametophytes. An additional but equally important discovery is one which has as its basis the fact that the agents considered herein may under appropriate conditions exert a differential activity on the male and female gametophytes. Proper control of application rate, timing of application, and relative non-phytotoxicity of the agents are prerequisite to making sterile the male gametophyte without sterilizing the female gametophyte. That the male gametopyhte alone is made sterile may be demonstrated by the following experiment. Corn plants were sprayed by an overhead spray with a solution of sodium 2,3-dichloroisobutyrate at a number of application rates between the range 0.1 to 5 pounds per acre. Applications were made with all rates at approximately weekly intervals from the time the plants were two weeks old until just prior to tassel development. As the tassels developed, they were bagged to prevent loss of pollen and at maturity the pollen was applied to silks of untreated plants with all precautions taken to ensure that uncontrolled pollination would not occur. Seed did not develop on plants to which pollen from a number of the treatments was applied, thereby demonstrating that the pollen was not viable. On the other hand, silks developed on a number of the treated plants and eventually produced essentially normal ears of corn after silks had been dusted with pollen obtained from untreated plants. Thus, it was established that the female gametophyte was not injured by those treatments, the plants of which produced seed. This differential activity toward the male and female gametophytes may be obtained by appropriate application rates and timing of application. It is demonstrated, moreover, that timing and application rates are not over-critical, when compounds of this invention are employed, and that the differential activity may be obtained at several application rates but the rate is dependent upon timing of application. Furthermore, the margin of safety with the agents of this invention is such that only high application rates applied to young plants are to a degree phytotoxic.

The importance of this discovery becomes apparent as it may be seen it provides a means whereby hybridization and hybrid seed production may be obtained through a differential control of the normal growth of male and female gametophytes of flowering plants. Millions of bushels of hybrid seed corn are produced annually by the laborious and costly procedure of removing tassels from the male parent of the hybrid. My discovery provides a method by which chemical detasseling of corn or its equivalent may be achieved at substantial reduction in cost and manpower. The cited example above is not limiting and the agents of this invention and the principles involved may be applied to any plant species or variety with which costly hand labor is required to obtain hybrid seed or with which hand labor is not normally used and hybrid seed is not produced because cost is prohibitive.

Pre-emergence herbicidal activities of a number of various chlorinated carboxylic acids were also studied. Seeds of plant species were sowed in 14 inch by 20 inch metal flats and solutions of salts of chlorinated acids were sprayed on the bare soil at the rate of five pounds of salt per acre. The flats were placed in the greenhouse under conditions for optimum germination and growth. Counts were made of seedlings which emerged two weeks following treatment. Comparisons were made with untreated flats to provide a rating in percentage of germination.

In flats planted with chickweed seed, there was 20% emergence where either sodium 2,2-dichloropropionate or sodium 2,3-dichloroisobutyrate was used and 25% emergence with sodium 2,2,3-trichloropropionate. In the case of crabgrass emergence was 15% where sodium 2,2-dichloropropionate was used and 20% where sodium 2,3-dichloroisobutyrate was used. Results comparable to these were obtained with other plant species such as Johnson grass and millet.

The data just given demonstrate that with pre-emergence herbicidal activity there appears to be marked similarity for different chlorinated aliphatic monocarboxylic acids. That these similarities are not general was demonstrated by pre-emergence tests with annual ryegrass and with a variety of lawn grass species.

Flats were sowed as above with seeds of ryegrass and a lawn grass mixture (Chewings fescue, meadow fescue, Kentucky bluegrass, Poa trivialis, and Highland bent grass). In the case of rye grass emergence was 20% with sodium 2,2-dichloropropionate and 3% with sodium 2,2,3-trichloropropionate, while sodium 2,3-dichloroisobutyrate permitted an emergence of 95%. For flats planted with the lawn grass mixture there was 10% emergence with sodium 2,2-dichloropropionate and 30% emergence with sodium 2,2,3-trichloropropionate. On the other hand, there was 90% emergence with sodium 2,3-dichloroisobutyrate.

Established lawn grass which had been mowed several times was sprayed with sodium salts of various chlorinated aliphatic acids at the rate of 5 lbs. per acre. Differences in phytotoxicity were evident, 2,2-dichloropropionate and 2,2,3-trichloropropionate burning the grasses severely; whereby 2,3-dichloroisobutyrate did not cause more than a slight but unobjectionable tip burn.

It is evident that the unique selective nature of the 2,3-dichloroisobutyrates may be practically applied to weed control in lawns. That the selectivity is in fact unique is further evidenced because in general chlorinated aliphatic monocarboxylic acids concerned are primarily phytotoxic toward monocotyledonous plants.

Furthermore, the examples cited above provide evidence to establish that sodium 2,3-dichloroisobutyrate and other soluble dichloroisobutyrates are not translocated so readily as the other chlorinated acids and their salts which have been studied, because the pre-emergence herbicidal activity on many plant species is similar but post-emergence activity is considerably different. Pre-emergence activity is not dependent on translocation since the compounds act during germination or kill the seedlings at a very early stage in their development. In other words, the intrinsic phytotoxic activities of the chlorinated aliphatic monocarboxylic acids are similar but many of the differences between pre-emergence and post-emergence activities are obtained because the various chlorinated aliphatic monocarboxylic acids ar not translocated within the plant to the various sites of action with the same facility. Because of these differences there is a wide margin of safety for 2,3-dichloroisobutyric acid and its salts as it is applied for the practical control of flowering and for other specific aspects of plant growth regulation.

I claim:

1. A process for selectively killing weeds among lawn grasses, which comprises applying to a lawn a compound from the class consisting of 2,3-dichloroisobutyric acid, and its water-soluble salts at a concentration and a rate sufficient to destroy said weeds without significant damage to the lawn grasses.

2. A process for selectively killing weeds among lawn grasses, which comprises applying to a lawn a compound from the class consisting of 2,3-dichloroisobutyric acid and its water-soluble salts at a concentration between about 0.01% and about 5% and at a rate between 0.1 pound and 10 pounds per acre, said rate being sufficient to control said weeds.

3. A process for altering the normal flowering cycle of crop plants and delaying the maturity thereof, which comprises applying to the foliage of growing plants prior to maturity of blossoms thereon a compound from the class consisting of 2,3-dichloroisobutyric acid and its water-soluble salts at a concentration and at a rate sufficient to alter the normal flowering and delay the maturity, without causing destruction of the thus treated plants.

4. A process for changing the normal flowering cycle of crop plants and for prolonging the vegetative state of growth of the plants which comprises applying to foliage of plants prior to maturing of blossoms thereon a compound from the class consisting of 2,3-dichloroisobutyric acid and its water-soluble salts at a rate sufficient to change the normal flowering and prolong the vegetative state of growth, said rate being from 0.1 pound to 10 pounds per acre.

5. A process according to claim 4 in which the soluble salt is sodium 2,3-dichloroisobutyrate.

6. A process for altering the normal pattern of growth and prolonging the vegetative state of growth of plants, which comprises applying to the foliage of plants while in a growing state a compound from the class consisting of 2,3-dichloroisobutyric acid and its water-soluble salts at a concentration and at a rate insufficient to cause destruction of the plants and sufficient to change the normal development thereof.

7. A process for regulating the growth of crop plants which comprises applying to the foliage of plants while in a growing state a plant growth-regulating amount of a compound from the class consisting of 2,3-dichloroisobutyric acid and its water-soluble salts at a rate from 0.1 pound to 10 pounds per acre.

8. A process for regulating the growth of plants which comprises treating the foliage of growing plants with a compound from the class consisting of 2,3-dichloroisobutyric acid and its water-soluble salts at a concentration and at a rate sufficient to regulate the growth of and insufficient to destroy the treated plants.

References Cited in the file of this patent

UNITED STATES PATENTS

| | | |
|---|---|---|
| 2,636,816 | Stewart | Apr. 28, 1953 |
| 2,642,354 | Barrons | June 16, 1953 |
| 2,880,082 | Toornman | Mar. 31, 1959 |

OTHER REFERENCES

Guttenberg, in "Chemical Abstracts," vol. 48, col. 10845(i), 1954.

Barrons et al.: "Down to Earth," vol. 10, No. 3, p. 16 (Winter, 1954), published by Dow Chemical Co.